United States Patent [19]
Vogelsanger

[11] Patent Number: 5,875,554
[45] Date of Patent: Mar. 2, 1999

[54] RESCUE TOOL

[75] Inventor: Brune Vogelsanger, Oregon City, Oreg.

[73] Assignee: Rescue Technology, Inc., Clackamas, Oreg.

[21] Appl. No.: 773,024

[22] Filed: Dec. 24, 1996

[51] Int. Cl.⁶ .................................................. B26B 15/00
[52] U.S. Cl. ............................................... 30/228; 30/258
[58] Field of Search .............................. 30/228, 258, 229, 30/279.2, 245

[56] References Cited

U.S. PATENT DOCUMENTS

| | | | |
|---|---|---|---|
| 2,273,376 | 2/1942 | Reynolds | 30/258 |
| 2,522,006 | 9/1950 | Wilcox . | |
| 3,262,201 | 7/1966 | Docken | 30/228 |
| 3,362,071 | 1/1968 | Schmidt | 30/258 |
| 3,819,153 | 6/1974 | Hurst et al. . | |
| 4,300,496 | 11/1981 | Price . | |
| 4,392,263 | 7/1983 | Amoroso | 30/228 |
| 4,734,983 | 4/1988 | Brick . | |
| 4,750,568 | 6/1988 | Roxton et al. . | |
| 4,872,264 | 10/1989 | LaBounty | 30/258 |
| 5,063,670 | 11/1991 | Eberhardt et al. . | |
| 5,125,158 | 6/1992 | Casebolt et al. . | |
| 5,187,868 | 2/1993 | Hall . | |
| 5,243,761 | 9/1993 | Sullivan et al. . | |
| 5,272,811 | 12/1993 | Armand | 30/228 |
| 5,421,230 | 6/1995 | Flaherty et al. . | |
| 5,465,490 | 11/1995 | Smith et al. . | |
| 5,474,278 | 12/1995 | Cleveland . | |
| 5,566,454 | 10/1996 | Eisenbraun | 30/228 |

FOREIGN PATENT DOCUMENTS 887578  7/1953  Germany .................................. 30/228

*Primary Examiner*—Hwei-Siu Payer
*Attorney, Agent, or Firm*—Klarquist Sparkman Campbell Leigh & Whinston, LLP

[57] ABSTRACT

A hydraulically powered, self-contained rescue tool has a cutting head, a hydraulic motor, a battery-powered hydraulic fluid pump, and all the controls necessary for operation of the tool. The cutting head can be pivotally mounted so that the angle of attack of the cutting blades are adjustable for convenience of the operator. The cutting blades are shaped so that, when the tool is in use, the blades take bites of material out of the object to be cut and there is no torque to twist the tool out of the grasp of the operator.

20 Claims, 9 Drawing Sheets

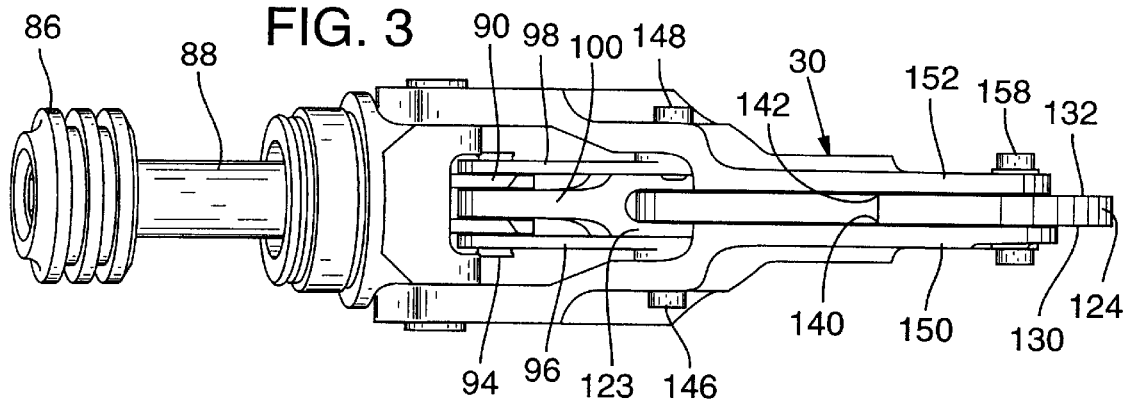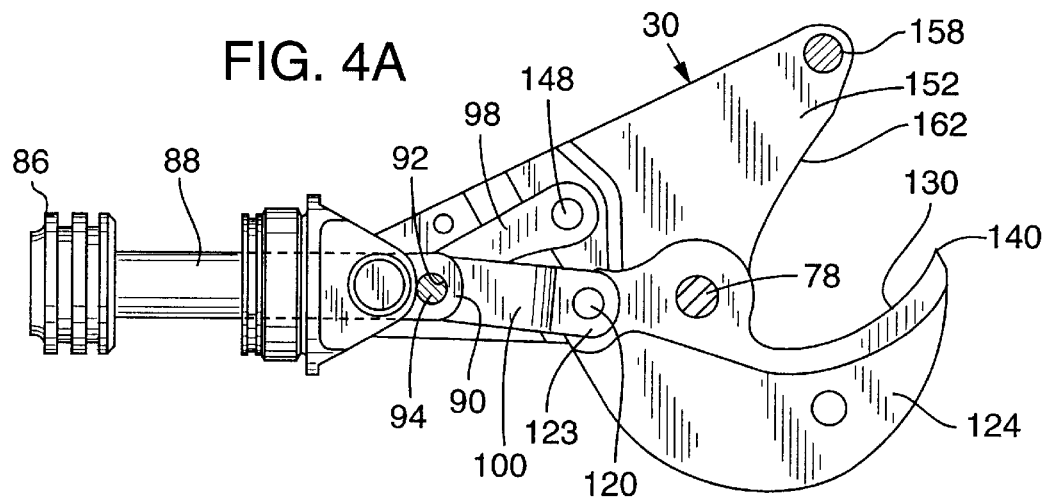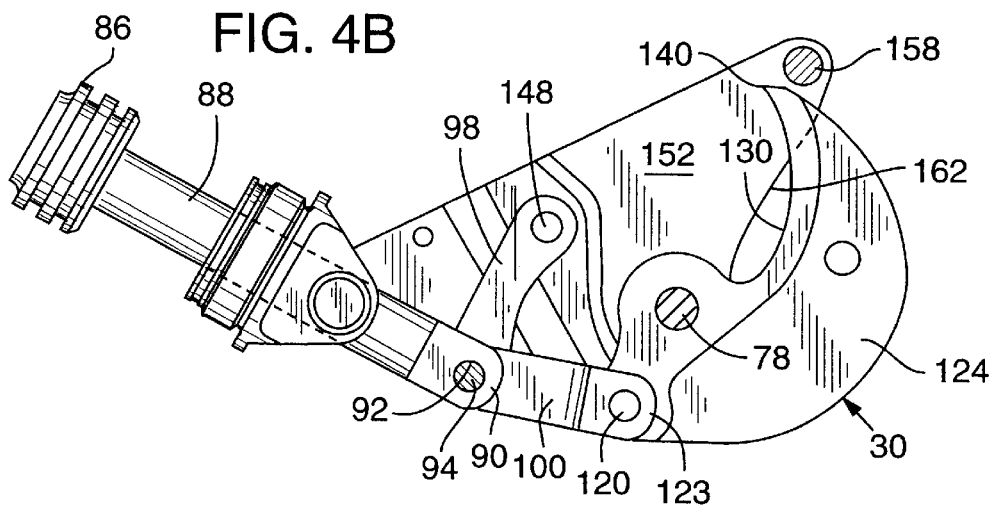

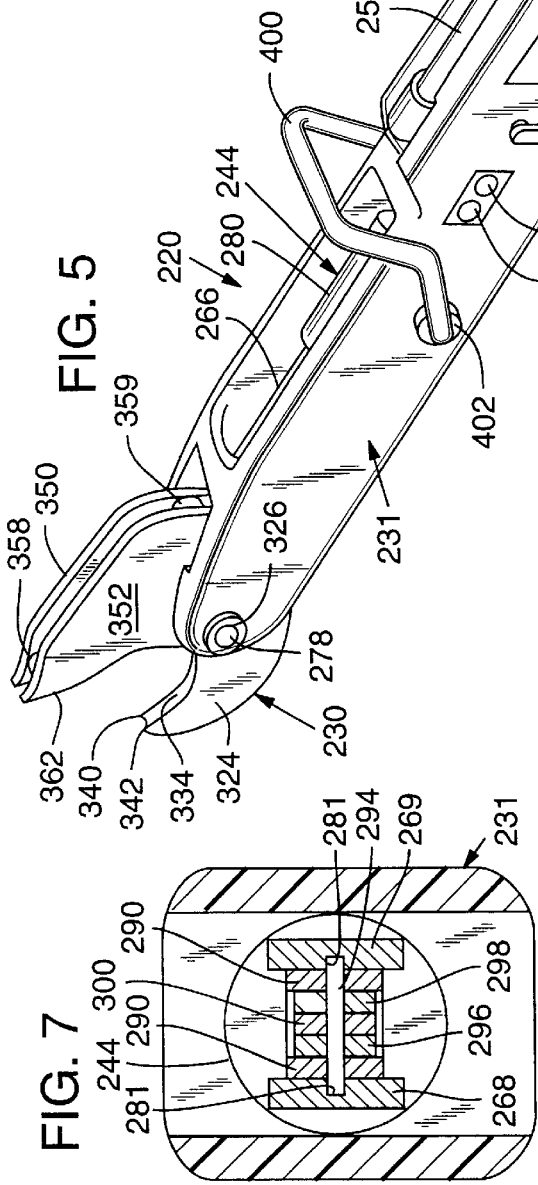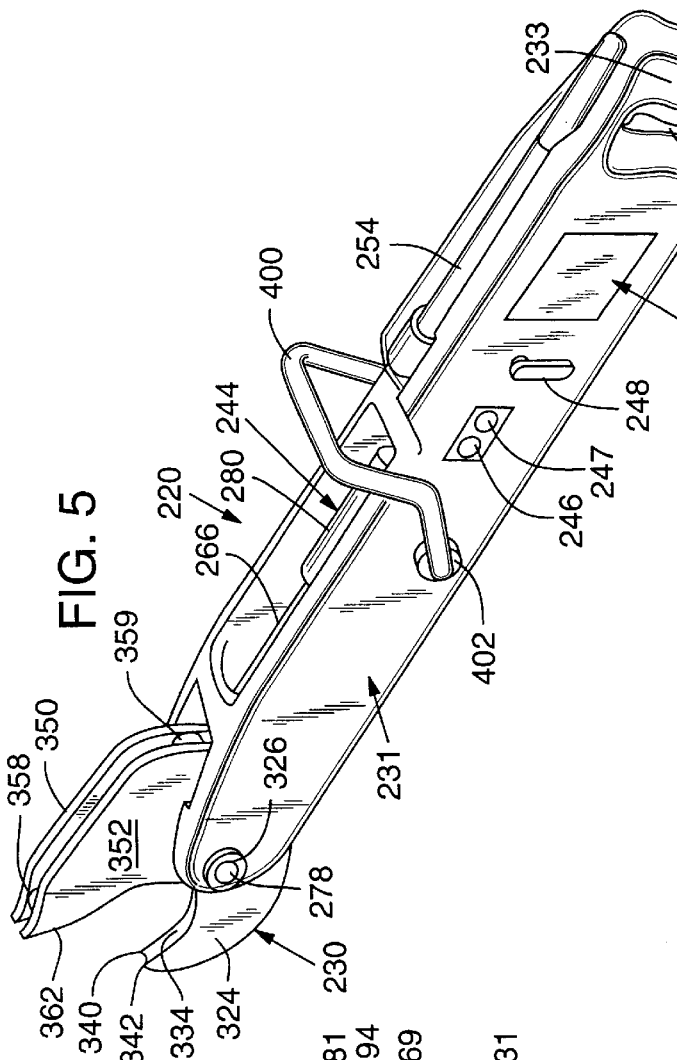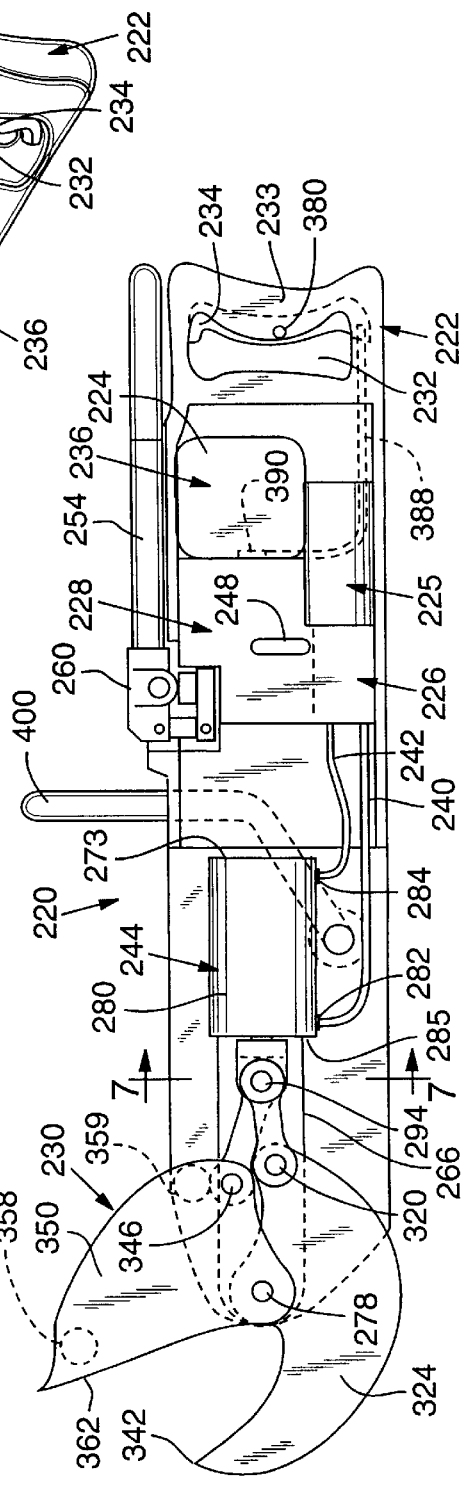

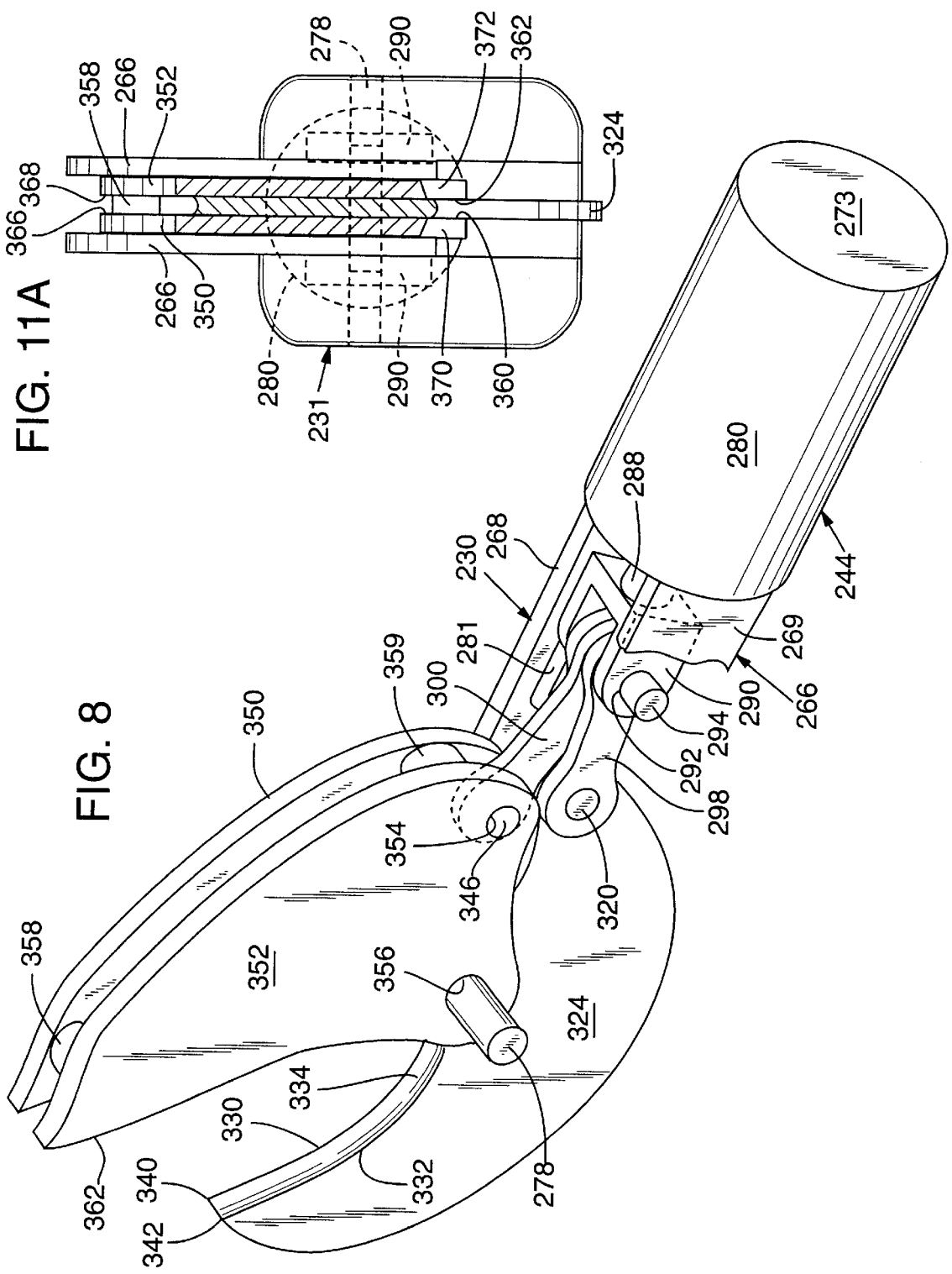

RESCUE TOOL

The present invention relates to fluid-powered tools that are used to apply force where needed in a rescue operation, such as to cut open an automobile at the site of a collision.

A variety of rescue tools have been developed to help at the site of emergency operations. These tools are designed to exert force on an object, such as an automobile body, that needs to be cut or pried open. Tools of this type must be sufficiently portable to be used in remote sites, and must have a power source that does not rely on the availability of electrical outlets. Since spilled gasoline is a common occurrence at accident sites, the tool should be able to operate without making sparks or heat sufficient to ignite gasoline fumes.

The most well known of such tools, commonly referred to as "jaws of life," employs two arms that are pivotally connected. The arms can be moved toward or away from each other by a hydraulic motor which is connected by hydraulic lines, to a remote pump powered by an internal combustion engine. An example of such a device is shown in U.S. Pat. No. 3,819,153 (Hurst, et al.).

Other rescue tools are designed for cutting or shearing through materials such a sheet metal and plastic. These are used for operations such as cutting into a wrecked automobile body to free a trapped passenger. Although of some use, no commercial cutting tool has proven to be fully functional due to problems with the design of the cutting heads used with such tools.

It is a common problem of existing powered rescue tools that they are bulky and awkward to hold and operate. Some of the more commonly used tools are quite dangerous to use. Some such tools apply great forces in ways that can surprisingly twist a tool from a user's grip. In many cases, it is necessary to hold the tool in an elevated position or at an awkward angle such that the operator does not have good footing or balance when using the tool. This can lead to physical injury of the operator, nearby rescue workers, or the person being rescued.

Due to the danger, many types of rescue tools are intended to be used only by operators who are given periodic training in use of the tool. If there is no trained operator at the scene of an accident, the tool must go unused.

Thus, there remains a need for a rescue tool that is easy to operate and that is easy for a single operator to hold and position for cutting operations.

SUMMARY OF THE INVENTION

The present invention is a rescue tool of the type that cuts through metal and other materials.

The tool is hydraulically powered, but is completely self contained. Incorporated on a common frame are a cutting head, a hydraulic motor, a battery-powered hydraulic fluid pump, and all the controls necessary for operation of the tool.

A particularly advantageous tool includes a cutting head that is pivotally mounted so that the angle of attack of the cutting blades can be adjusted and the tool body can be held at an angle that is convenient to the operator. This is best accomplished by use of a cutting head that includes both cutting blade(s) and a hydraulic actuator on a frame that is tiltable in relation to the body of the tool.

The controls of the tool are simple to learn and use so that an operator does not require a great deal of training. The cutting head is designed so that, when the tool is in use, there is no torque to twist the tool out of the grasp of the operator.

BRIEF DESCRIPTION OF THE DRAWINGS

In the drawings:

FIG. 3 is an enlarged, top plan view of the cutter head of the rescue tool of FIG. 1;

FIGS. 4A and 4B are side elevational views of the cutter head of FIG. 3, with portions of the foreground structure removed to better show interior detail, the cutting head members being in open and closed positions respectively;

FIG. 5 is an oblique view of a second rescue tool according to the present invention;

FIG. 6 is a side elevational view of the rescue tool of FIG. 5 with a portion of the outer casing removed to show internal detail;

FIG. 7 is a vertical sectional view taken along line 7—7 of FIG. 6;

FIG. 8 is an enlarged, oblique view of the cutter head of the rescue tool of FIG. 5;

FIG. 11A is a vertical sectional view taken along line 11—11 of FIG. 10B;

DETAILED DESCRIPTION

Figure 1:
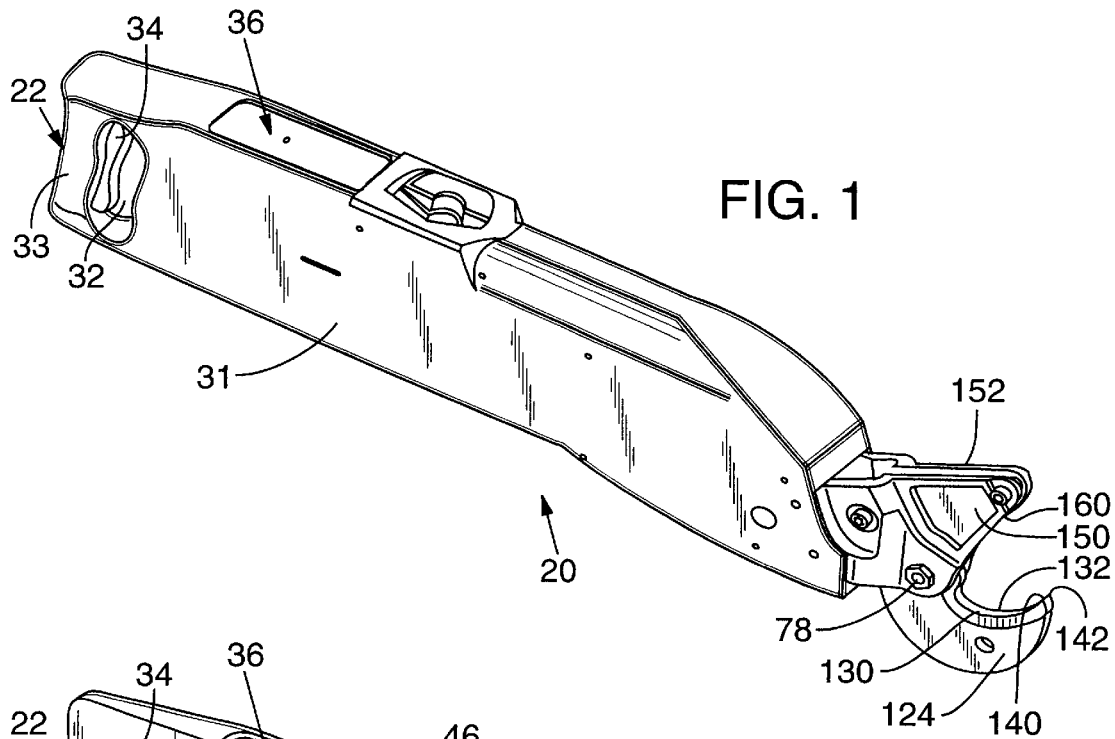
FIG. 1 is an oblique view of a rescue tool according to the present invention.
Figure 2:
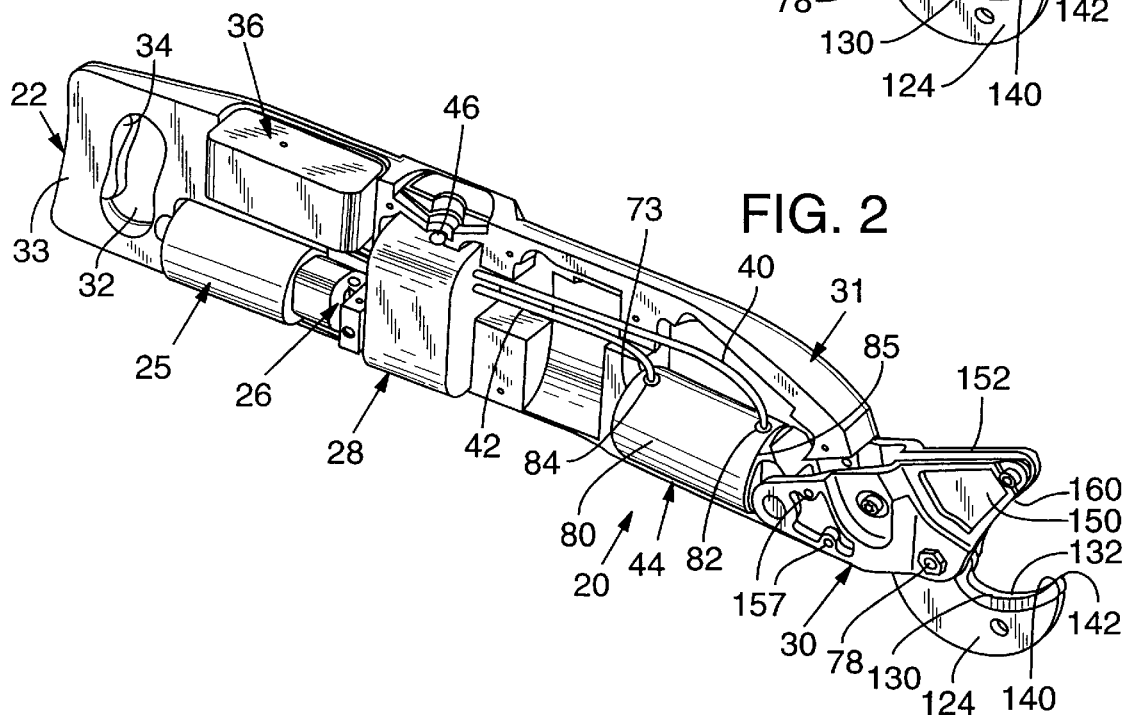
FIG. 2 is an oblique view of a rescue tool of FIG. 1 with a portion of the outer casing removed to show internal detail.
Figure 9:
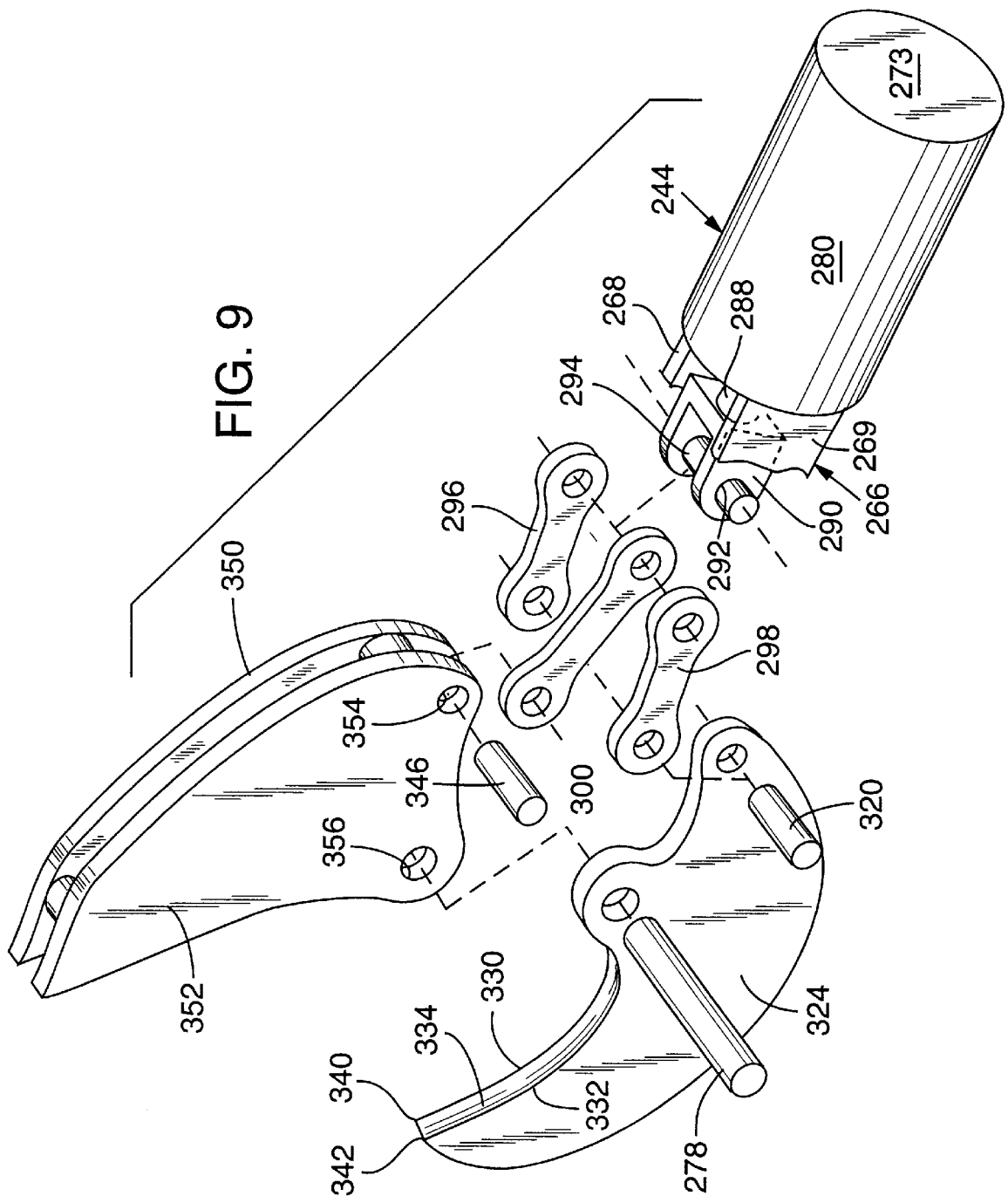
FIG. 9 is an exploded view of the cutter head of FIG. 8.

FIGS. 1–4 show a rescue tool 20 according to the present invention. As best seen in FIG. 2, the tool comprises several modules including a handle 22, a battery pack 36, a motor 25, a motor-powered hydraulic pump 26, a hydraulic fluid manifold 28, and a cutter head 30 mounted in a housing 31. Since the tool 20 may be used in areas where there is spilled fuel, it is best to use explosion proof electrical components where possible, and to contain all electrical components inside the housing 31

The handle section 22 is primarily to give the operator a gripping surface at the end of the tool that is distal from the cutter head. In the illustrated embodiment, the handle defines finger opening 32 and includes a hand grip 33. A three position switch, such as the illustrated rocker switch 34, is conveniently positioned on the handle 22 facing the finger opening 32 so that the operator can control the hydraulic and electrical systems of the tool as described below.

The switch is in an electrical circuit that connects the battery pack 36 to the electric motor 25 which mechanically drives the pump 26. In a first position, the switch opens the electrical circuit so that no fluid is pumped. In second and third positions, the switch causes the motor to operate and thereby pump hydraulic fluid. The switch 38 also controls a valve in the hydraulic system so that when the switch is in the second position, hydraulic fluid exerts pressure on a hydraulic motor in one direction, and when the switch is in the third position, the hydraulic fluid exerts pressure on the hydraulic motor in the opposite direction. An electrical or mechanical safety lock switch (not shown) could be provided to guard against inadvertent triggering of the switch 38 when the tool is not intended to be in use, although such a safety lock switch is of questionable value since it might fail or delay operation of the tool during an emergency.

The rechargeable battery pack 36 has simple electrical connections so that it can readily be replaced as needed in the field. Each tool 20 should be stored with at least one spare, charged battery pack 36 to serve as a back-up. Preferably the battery pack will contain multiple nickel cadmium (NiCad) cells.

The pump module 26 delivers pressurized hydraulic fluid for distribution by the manifold 28. The primary purpose of the manifold is to establish a hydraulic circuit, including hoses 40, 42 which serve as conduits deliver high pressure hydraulic fluid to power a hydraulic motor, in particular a hydraulic actuator 44 which is a part of the cutter head 30. The manifold 28 also has a port 46 which is accessible from the top of the tool. The port 46 has dropless quick couplers for attaching external hydraulic hoses (not shown) for powering the external device. Typically the external or auxiliary device will have its own associated flow controls for manipulation by the operator. The operator can disconnect the cutter head circuit and direct pressurized fluid to the port 46 by operating a valve (not shown) associated with the manifold.

The illustrated actuator 44 is a double acting hydraulic cylinder which includes a body 80. The body defines two ports 82, 84 which communicate with the hoses 40, 42 and which has a first end 73 and second end 85. A piston 86 is located inside the body between the ports 82, 84 and is connected to a piston rod 88 that extends through an opening defined by the second end 85 of the body 80. A clevis bracket 90, mounted at the outer end of the rod 88, defines two openings 92 which receive a pin 94.

The pin 94 pivotally secures three linkage arms 96, 98, 100 to the piston rod 88 with arm 100 sandwiched between arms 96, 98. Each of the arms is elongated and defines two openings to receive pivot pins. In each case, one of the openings receives the pin 94.

The cutter head 30 has multiple cutting members which are movable relative to one another. In particular, the arm 100 is forked, at its end distal from the rod 88, to form a clevis bracket 123 which receives a cutter blade 124. The blade 124 defines two openings. A first opening receives a pin 120 and a second opening receives a pin 78 in such a manner that the blade 124 can pivot about both pins. The blade 124 has two curved cutting edges 130, 132 that lie in parallel planes and that are directly opposed and of identical curvature. The edges 130, 132 extend to piercing points 140, 142 at the outermost end of the blade.

The other of the openings of arms 96, 98 receive pins 146, 148 which pivotally connect the arms 96, 98 to two anvil blades 150, 152. Pins 78, 94, 120, 146, and 148 have axes of rotation, all of which extend in parallel to each other in the illustrated embodiment, and all of which are perpendicular to the planes which contain the cutting edges 130, 132.

The blades 150, 152 also define second openings which receive the pin 78 so that the blades 124, 150, 152 are pivotally secured together. The blades 150, 152 are fixedly secured to the casing 31 by screws (not shown) that are received in screw sockets 157. Blades 150, 152 have cutting edges 160, 162 that lie in parallel planes and that are directly opposed and of identical curvature. A spacer 158 is secured between the anvil blades 150, 152 by a screw or bolt to maintain the cutting edges 160, 162 a precise distance apart.

The cutting edges 160, 162 of the anvils 150, 152 and the cutting edges 130, 132 of the blade 124 are shaped such that, when the motor 25 operates at a constant speed, the junction of each edge 130, 132 of the blade and the corresponding edge 160, 162 of the adjacent anvil moves at a constant speed along the edge of the blade.

The tool best is operated by a person who has received basic training in its workings. But, because the operation is largely intuitive, the tool can be used in an emergency by almost any person who is strong enough to lift it. The operator first determines whether it is desirable to perform a cutting operation or whether an auxiliary tool should be used. If the cutter head 30 is to be used, the valve which operates the auxiliary ports 46 is turned off and the hand switch 34 is operated. Rocking the hand lever 34 in one direction causes the blades 124, 150, 152 to open. Rocking the hand lever 34 in the opposite direction causes the blades to close.

If the tool is stored with the blades in the closed position, the operator operates the hand lever 34 to open the blades. Next the tool is positioned so that the object to be cut is received between the upper blades 150, 152 and the lower blade 124. The operator then rocks the hand lever to the position which causes the blades to close, that is, to move from the position shown in FIG. 4A to the position shown in FIG. 4B. This operation involves the pumping of hydraulic fluid through the line 42 and into the actuator 44. The fluid pumped into the actuator causes the rod 88 to extend and push the pin 94 away from the actuator. This motion of the pin 94 causes the pin 120 to move away from the pins 146, 148, thereby rotating the blade 124 about the pin 78 relative to the anvils 150, 152 . Because the anvils are mounted in a fixed position relative to the casing 31, the actuator body 80 rotates about the pin 94 and moves upwardly, inside the casing 31, as illustrated by the elevated position of the piston 86 in FIG. 4B.

As the blades move toward the closed position, the object to be cut is first grasped by the piercing points 140, 142 which anchor the object against the anvil blades 150, 152. This arrangement inhibits any slipping of the tool relative to the workpiece during the cut. The cut proceeds with the cutting edges 130, 132 of the blade 124 overlapping and traveling along the cutting edges 160, 162 of the blades 150, 152. When the blades 124, 150, 152 completely overlap, an elongated bite or strip of limited length has been taken out of the object to be cut. After a first strip is cut from the object, if necessary, a second bite can be taken from the same object by opening the blades, sliding the blade 124 forward into the gap left by removal of the first bite, and then closing the blades to take a second bite. Because an area of material is removed each time a bite is taken and because at least one of the cutting members is no wider than the strip that is cut away, it is possible to keep moving the cutter head 30 forward through the workpiece as many times as is necessary to cut additional strips from the workpiece until it is cut through completely.

FIGS. 5–12 illustrate a second embodiment of the invention. As best seen in FIG. 6, a tool 220 comprises a cutter head 230 pivotally mounted in a support member or housing 231 which has or contains several modules including a handle 222, a battery pack 236, an electrically-powered motor 225, a hydraulic pump 226, and a hydraulic fluid manifold 228.

The support member 231 is sized and shaped so that it can be held and manipulated by a rescue worker. The handle section 222 defines finger opening 232 and includes a handgrip 233. A three position switch 234 is positioned on the handle 222 so that the operator can control the hydraulic and electrical systems of the tool.

The switch 234 is in an electrical circuit that connects the battery pack 236 to the electric motor 225. In a first position, the switch opens the electrical circuit so that no fluid is pumped. In second and third position s the switch causes the motor to operate and thereby pump hydraulic fluid. The switch 234 also controls a valve in the hydraulic system so that when the switch is in the second position, hydraulic fluid exerts pressure on a hydraulic motor in one direction, and when the switch is in the third position, the hydraulic fluid exerts pressure on the hydraulic motor in the opposite direction.

A battery compartment 224 is provided inside the housing 231 to contain the rechargeable battery pack 236. The battery pack is shaped to conform to an opening in the side of the housing 231 and interacts with a latch mechanism (not shown) so that the battery pack 236, when installed, is latched in place and fills the opening with one wall of the battery pack forming a portion of the side of the housing. Because one wall of the battery pack forms a part of the housing 231, the absence of a battery pack will be readily apparent to the operator. This helps to prevent an operator from forgetting to install a battery pack before transporting the tool 220 for use in a remote location. The battery pack readily can be removed and replaced with a charged battery pack as needed in the field.

A power source other than the battery pack can be used in an emergency situation. When a battery pack is removed, the tool's electrical battery contacts (not shown) are exposed. Any source of sufficient electrical current can be connected to the contacts to power the tool. The preferred electrical system operates at twelve volts, so an automotive battery or twelve volt generator can be wired to the contacts for operation of the tool when no charged battery packs are available. To facilitate such emergency operation, it is helpful for the tool electrical circuit to contain overload protection and to have the ability to operate regardless of the polarity of the power source connections to the battery contacts.

The pump module 226, which is powered by the motor 225, delivers pressurized hydraulic fluid for distribution by the manifold 228. The manifold provides a hydraulic circuit, including hoses 240, 242, to power a hydraulic motor, in particular a double-acting hydraulic actuator 244 which is a part of the cutter head 230. The manifold 228 also has ports 246, 247 which are accessible from a side of the tool. The ports 246, 247 have one or more dropless quick couplers for attaching external hydraulic hoses 250, 252 to power an external device 253. The operator can direct pressurized fluid to the ports 246, 247 by operating a valve handle 248 on the side of the tool. The valve handle 248 controls a valve 249 in the manifold.

An auxiliary mechanical pump 255 is provided inside the manifold 228 to be used if the electric pump module 226 is inoperable or to provide pressure above the amount that can be provided by the electrical pump 226. A pump handle 254 is pivotally connected to the manifold 228 by brackets 256, 260. A push rod 258 connects the auxiliary pump 255 to the handle 254 by a pivotal connection to the bracket 260. The mechanical pump 255 is operated by repeatedly raising and lowering the pump handle 254. Pressure relief valves 262, 264 are provided to prevent overloading of the hydraulic circuits.

The cutter head 230 includes a frame 266 which, in the illustrated embodiment, comprises the body 280 of the hydraulic actuator 244, two parallel track arms 268, 269 which extend from and are rigidly connected to the body 280 of the hydraulic actuator 244, and a pin 278 which extends through openings in the arms 268, 269. Each arm defines a slot 281 which receives an outer extension of the pin 294. The slots 281, which may be channels of limited depth as illustrated or slots which extend entirely through the arms 268, 269, serve as cams or tracks that direct the motion of the pin 294, the outer extensions of the pin 294 serve as followers that follow the paths provided by the slots 281.

The illustrated actuator 244 is a double acting hydraulic cylinder having a body 280 which defines two ports 282, 284 that communicate with the hoses 240, 242 and that has a first end 273 and second end 285. A piston (not shown) is located inside the body 280 between the ports 282, 284 and is connected to a piston rod 288 that extends through an opening defined by the second end 285 of the body 280. A clevis bracket 290, mounted at the outer end of the rod 288, defines two openings 292 which receive a pin 294.

The pin 294 pivotally secures three linkage arms 296, 298, 300 to the piston rod 288 with arm 300 sandwiched between arms 296, 298. Each of the arms is elongated and defines two openings to receive pivot pins. In each case, one of the openings receives the pin 294. The other of the openings of arms 296, 298 receives a pin 320 which pivotally connects the arms 296, 298 to a cutter blade 324 that is received between the arms 296, 298.

The blade 324 defines two openings. A first opening receives the pin 320 and a second opening receives the pin 278 in such a manner that the blade 324 can pivot about both pins . The pin 278, which extends generally perpendicularly to the finger opening 232 and grip 233, pivotally secures the cutter head 230 to the housing 231. The support member or housing 231 defines two, spaced-apart openings 326, one of which appears in FIG. 5. The outermost portions of the pin 278 extend outwardly from the arms 268, 269 and act as two opposed, outwardly-extending trunnions which are journaled in the openings 326 so that the cutter head, including the frame 266, can rotate relative to the support member 231.

As best seen in FIG. 8, the blade 324 has two curved cutting edges 330, 332 that lie in parallel planes and that are directly opposed and of identical curvature. A concave surface 334 extends between the edges. The edges 330, 332 extend to piercing points 340, 342 at the outermost end of the blade.

The second opening of arm 300 is located between two anvil blades 350, 352 each of which defines a first opening 354. A pin 346 extends through these openings and pivotally connects the arm 300 to the anvil blades 350, 352. The blades 350, 352 also define second openings 356 which receive the pin 278 so that the blades 324, 350, 352 are pivotally secured together and to the housing 231. The axes of the pins 278, 294, 320, and 346 are axes of rotation, all of which extend in parallel to one another in the illustrated embodiment.

Figure 11B:
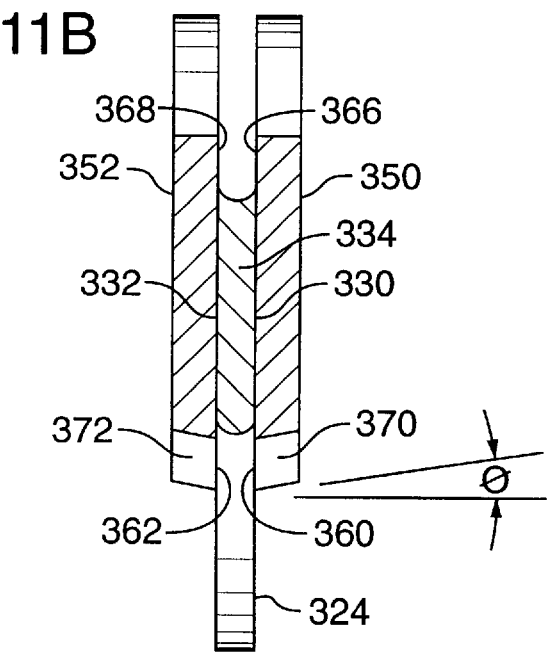
FIG. 11B is an enlarged, partial vertical sectional view taken along line 11—11 of FIG. 10B.
Figure 12:
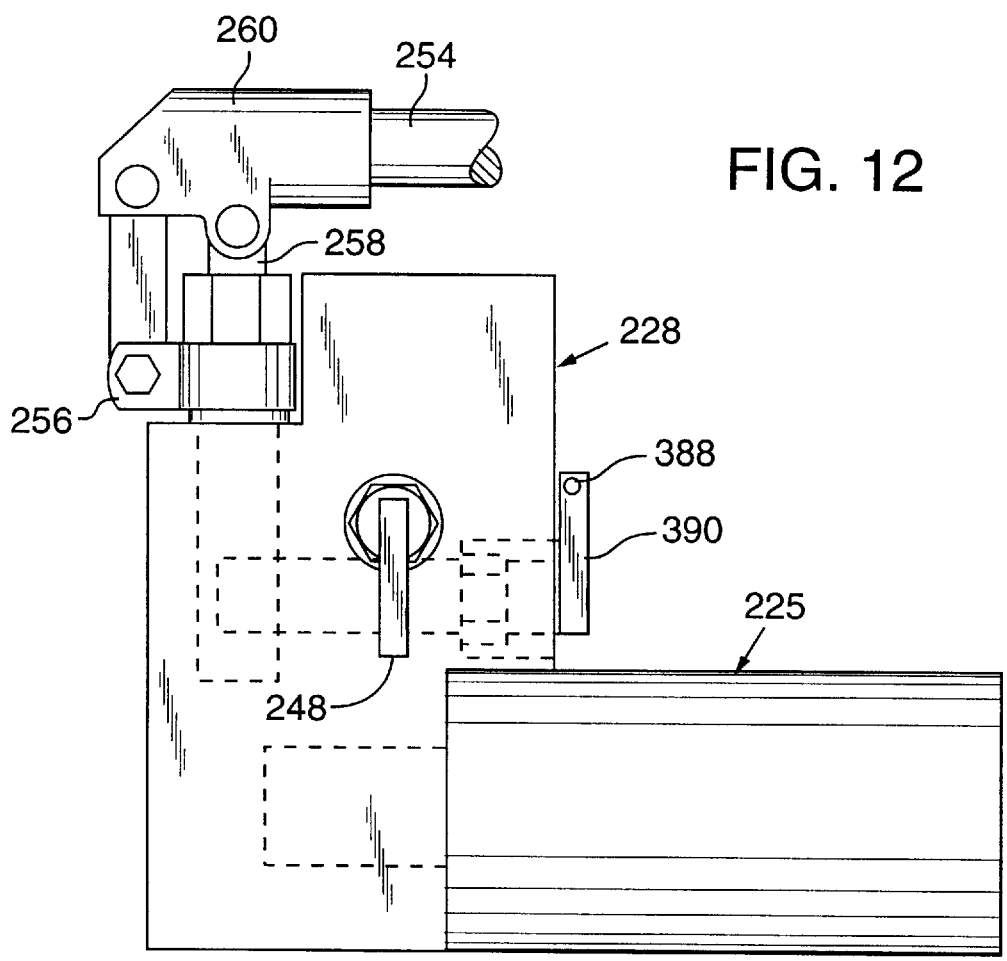
FIG. 12 is an enlarged, side elevational view of the manifold and pump of the rescue tool of FIG. 5.
Figure 13:
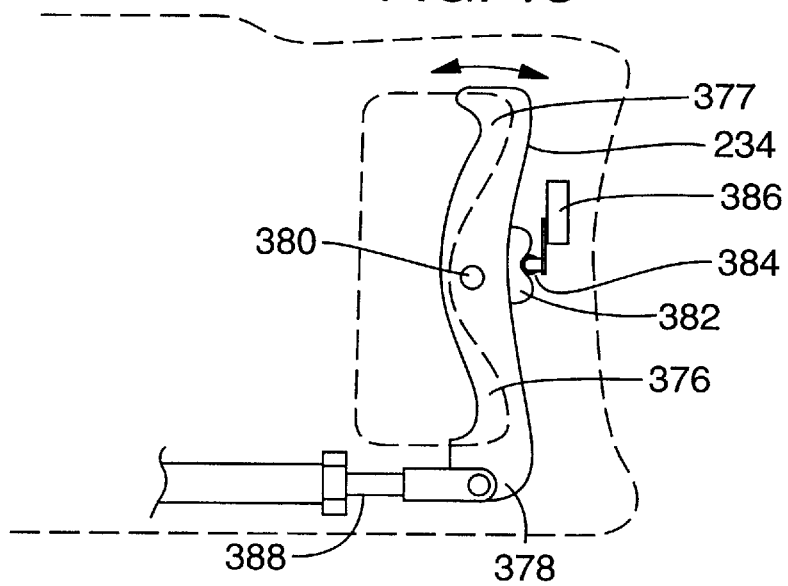
FIG. 13 is and enlarged, side elevational view of the hand switch of the rescue tool of FIG. 5.
Figure 14:
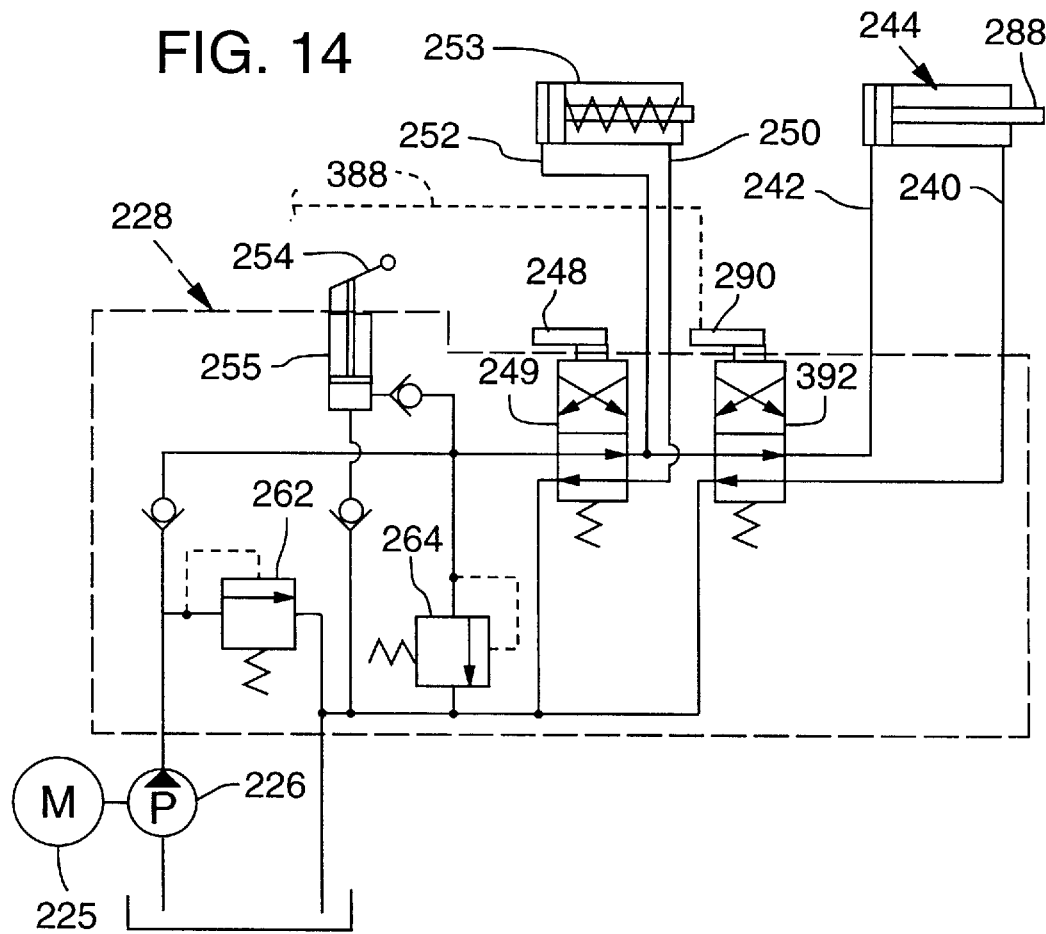
FIG. 14 is a hydraulic circuit diagram for the rescue tool of FIG. 5.

The blades 350, 352 have cutting edges 360, 362 that lie in parallel planes and that are directly opposed and of identical curvature. Spacer 358, 359 are secured between the anvil blades 350, 352 by screws or bolts to maintain the cutting edges 360, 362 a precise distance apart. The cutting edges 360, 362 are at the intersections of inner side faces 366, 368 of the blades 350, 352 and end faces 370, 372 of those blades. The end faces 370, 372 are not perpendicular to the side faces 366, 368, but instead slope back from the side faces at a small angle ø as shown in FIG. 11B. Blades of the embodiment of FIGS. 1–4 also have sloping faces to facilitate cutting.

FIGS. 12–15 show details of the hydraulic and electrical control apparatus. The hand switch 234 includes a handle 376 which has an upper portion 377 and a lower portion 378. The handle 376 is pivotally mounted to rock about a pin 380 which is located between the upper and lower portions 377, 378 and which secures the handle 376 to the handgrip 233. This handle 376 is connected to both the electrical and hydraulic control systems. On an enclosed surface of the handle 376 is a cam 382 which cradles a cam follower 384. The follower 384 is connected by a lever arm to a microswitch 386 in the electrical circuit which supplies current to the motor 225. When the switch handle 234 is in a centered or first handle position, the follower does not exert sufficient force on the lever arm to close the contacts of the microswitch 386 so the motor does not operate. If the operator squeezes the upper portion 377 so that the upper portion rocks toward the handgrip 233 to a second handle position, the follower 384 moves along the cam 382 to a position where additional force is applied to the lever arm and the switch 386 closes and activates the motor 225 and causes the pumping of hydraulic fluid. Similarly, if the operator squeezes the lower portion 378 of the handle 376 so that the lower portion rocks toward the handgrip 233 to a third handle position, the follower 384 moves along the cam 382 to a position where additional force is applied to the lever arm and the switch 386 closes and activates the motor 225 and causes the pumping of hydraulic fluid. Thus, the motor 225 operates when the handle 376 is in either the second or third positions.

The handle 376 also controls the direction of jaw movement by means of a sheathed cable 388 that connects the handle 376 to a lever 390 on the manifold 228. The lever controls a spool valve 392 which controls the direction of flow of hydraulic fluid to and from the actuator 244. When the handle is moved to the second position, the cable 388 is extended (moved to the left in FIG. 13) which rotates the lever to a position where the valve 392 channels hydraulic fluid from the pump 226 through the line 240, which causes the rod 288 to retract and the jaws to open. Conversely, when the handle is moved to the third position, the cable 388 is retracted (moved to the right in FIG. 13) which rotates the lever to a position where the valve 392 channels hydraulic fluid from the pump 226 through the line 242, which causes the rod 288 to extend and the jaws to close.

A midsection handle 400 is provided to help control the tool. The handle 400 is preferably located at about the center of gravity of the tool so that the operator can support the tool by the handle 400, while tilting it to a desired angle using the handle 222. The illustrated handle has pivot mountings 402 that allow the handle 400 to be tilted fore and aft to a position most convenient to the operator. The handle can be locked in any of several positions by a latch mechanism (not shown).

It is a highly useful feature of the embodiment of FIGS. 5–14 that the cutter head 230 is mounted to pivot relative to the casing 231 about the axis of the pin 278 . Rescue cutting tools must be very sturdy in order to exert the force required to cut through metal; this means the such tools are somewhat bulky and can be quite awkward to hold. Since the location of the workpiece dictates the necessary orientation of the cutter head, the tool may need to be held in a very awkward position, from the prospect of the operator, when the tool has a fixed cutter head as does the tool shown in FIGS. 1–4.

Figure 10A:
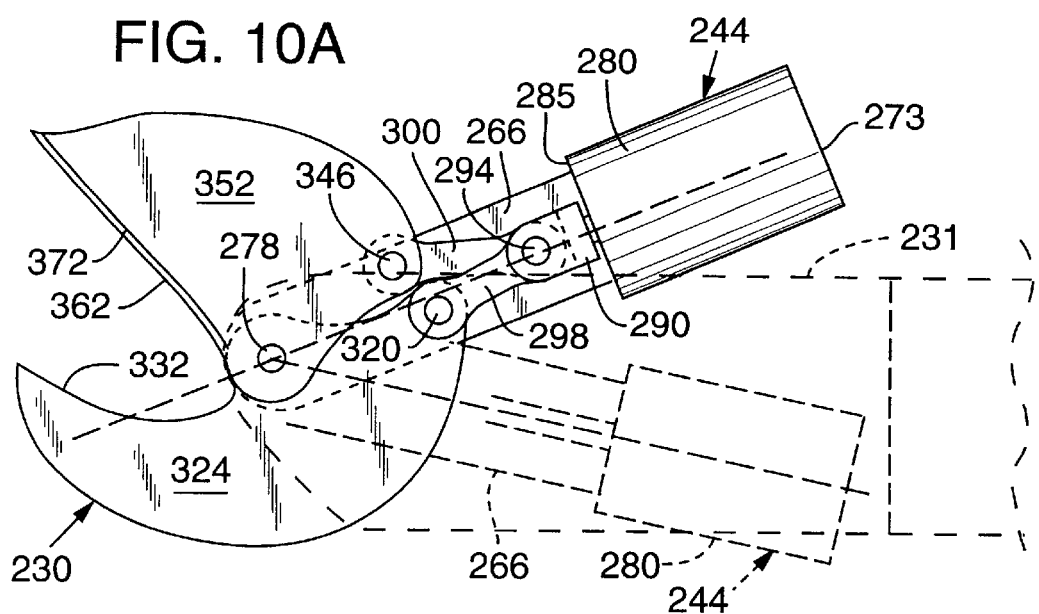
FIGS. 10A and 10B are side elevational views of the cutter head of FIG. 8, with cutting head members in open and closed positions respectively.
Figure 10B:
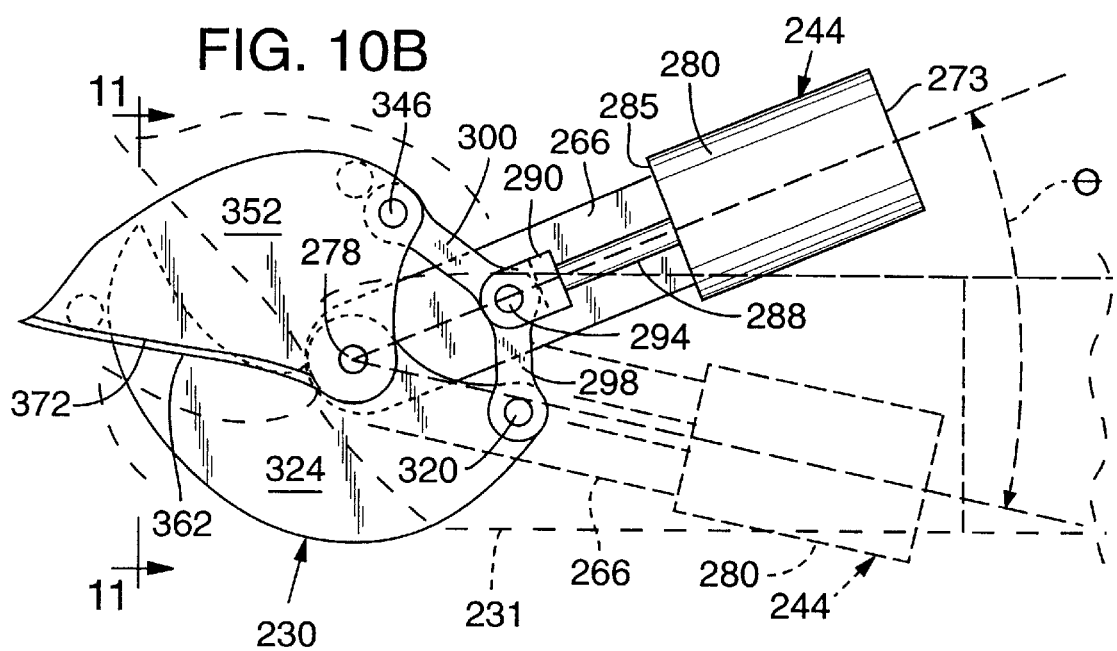

The tool of FIGS. 5–14 has a cutter head 230 that can rotate through an arc 8 between jaws-raised and jaws-lowered positions as shown by broken and solid lines in FIG. 10B. This range of free movement allows the handle section 222 and cutter head 230 to be independently positioned at favorable orientations with regard to the operator and workpiece. Since the actuator 244 pivots with the rest of the cutter head 230, the rod 288 can be moved (and the tool operated) when the cutter head is in the jaws-raised position, in the jaws-lowered position, and everywhere in between.

Figure 15:
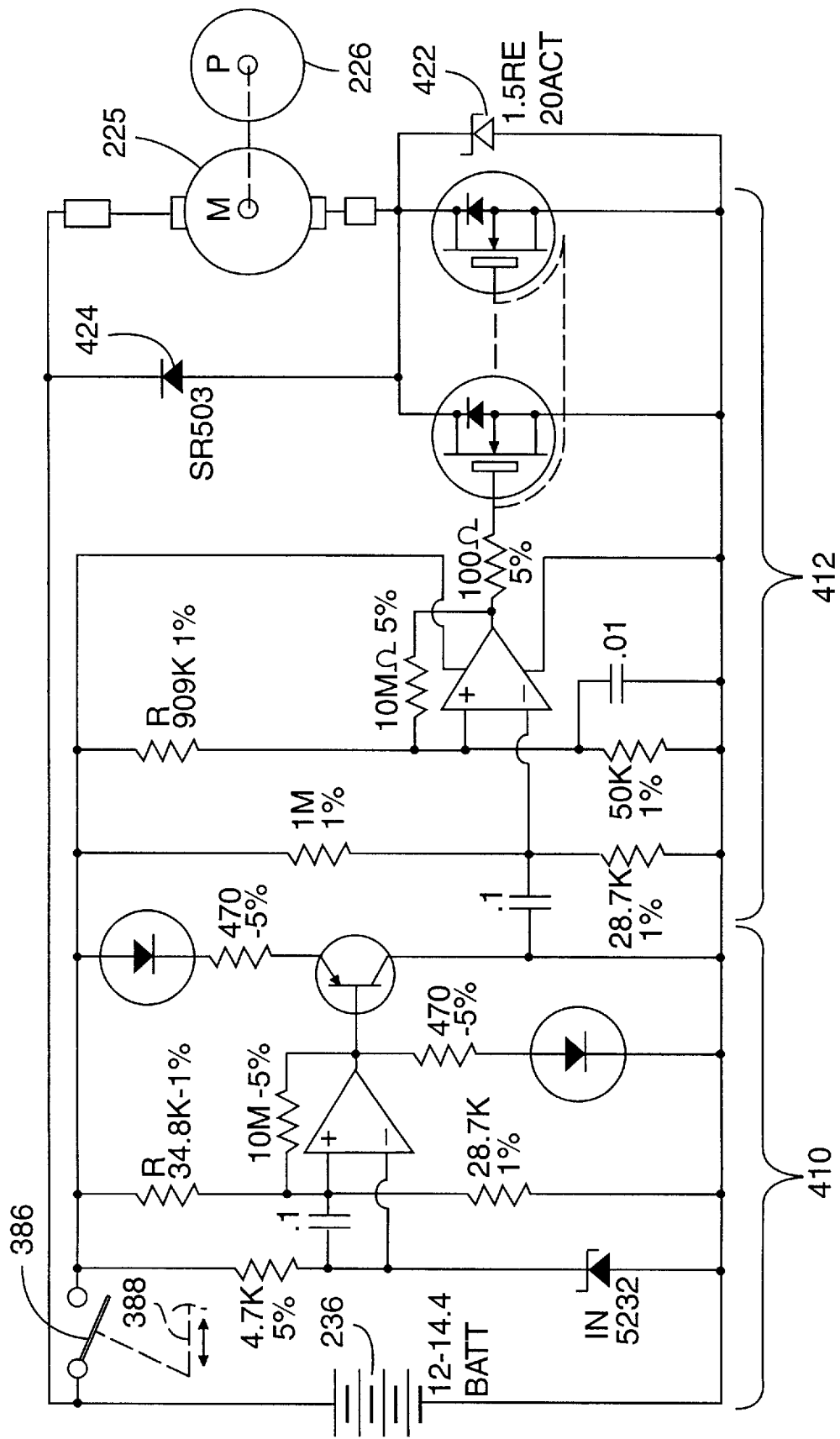
FIG. 15 is an electrical circuit diagram for the rescue tool of FIG. 5.

FIG. 15 is an electrical circuit diagram. The circuit has a first section 410 which includes light emitting diodes to indicate battery status and a second section 412 which is a motor controller. The battery status portion of the circuit responds when voltage drops to below 12.1 volts, at which point the "low battery" LED is turned on and the "high battery" LED is turned off. The motor controller section 412 responds electrically when the switch 386 is moved between the open and closed positions. When the switch 386 is open, the power MOSFETs do not conduct so that current can not flow to the motor 225. When the switch 386 is closed, the power MOSFETs are rendered conductive so that current flows to the motor and the motor operates. The diode 422 limits voltage across the motor, and the diode 424 prevents reverse feedback through the motor.

To operate the tool, an operator first determines whether it is desirable to perform a cutting operation using the cutter head 230 or whether an auxiliary tool should be used. If the cutter head is to be used, the valve 249 which controls flow to the auxiliary ports 246 is closed by moving the handle 248 to the "off" position or leaving the handle in that position. Next the hand switch 234 is operated. Rocking the hand lever 234 in one direction causes the blades 324, 350, 352 to open. Rocking the hand lever 234 in the opposite direction causes the blades to close.

If the tool is stored with the blades in the closed position, the operator operates the hand lever 234 to open the blades. Next the tool 220 is positioned so that the object to be cut is received between the upper blades 350, 352 and the lower blade 324. The operator then rocks the hand lever 234 to the position which causes the blades to close, that is, to move from the position shown in FIG. 10A to the position shown in FIG. 10B. This operation involves the pumping of hydraulic fluid through the line 242 and into the actuator 244. (If the tool fails to respond due to an electrical failure when the lever 234 is tilted, the same effect can obtained by tilting the lever 234 and pumping the hand pump 255). The fluid pumped into the actuator causes the rod 288 to extend and push the pin 294 away from the actuator so that the ends of the pin 294 move along the tracks 281. This motion of the pin 294 causes the pins 320, 346 to move away from each other, thereby rotating the blade 324 about the pin 278 relative to the anvils 350, 352.

As the blades move toward the closed position, the object to be cut is first grasped by the piercing points 340, 342 which anchor the object against the anvil blades 350, 352. The cut proceeds with the cutting edges 330, 332 of the blade 324 overlapping and traveling along the cutting edges 360, 362 of the blades 350, 352 When the blades 324, 350, 352 completely overlap, an elongated bite or strip of limited length has been taken out of the object to be cut. After a first strip is cut from the object, if necessary, a second bite can be taken from the same object by opening the blades, sliding the blade 324 forward into the gap left by removal of the first bite, and then closing the blades to take a second bite.

If an auxiliary tool is to be used, the valve 249 which controls flow to the auxiliary ports 246 is opened by moving the handle 248 to the "on" position or leaving the handle in that position and connecting hoses 250, 252 from the auxiliary tool 253 to tie ports 246. Next the hand switch 234 is operated. Rocking the hand lever 234 causes hydraulic fluid to be pumped to one of the ports 246 to supply pressurized hydraulic fluid to the auxiliary tool. If the auxiliary tool requires a greater amount of hydraulic pressure than can be supplied by the motor driven pump 226, the hand pump 225 can be operated to supply additional pressure.

In view of the above, it is to be understood that the present invention includes all such modifications as may come within the scope and spirit of the following claims and equivalents thereof.

I claim:

1. A hand manipulatable rescue tool comprising:

a frame that defines a cam path;

an anvil member having a first anvil that is attached to the frame and has a cutting edge, and a second anvil which has a cutting edge shaped the same as the cutting edge of the first anvil, the first and second anvils being spaced apart in fixed positions relative to one another such that the cutting edges face each other and lie in parallel planes;

a cutting blade mounted between the anvils such that the blade and anvil member can be rotated relative to one another about an axis of rotation that is perpendicular to the planes, the blade having two spaced-apart cutting edges which are positioned such that, when the blade is rotated, the cutting edges of the blade overlap and travel along the cutting edges of the anvils;

a pivot member;

a follower which is connected to the pivot member and which is positioned to follow the cam path;

a first link arm, one portion of the first link arm being pivotally mounted to the anvil member and another portion of the first link arm being pivotally mounted to the pivot member;

a second link arm, one portion of the second link arm being pivotally mounted to the cutting blade and another portion of the second link arm being pivotally mounted to the pivot member such that both link arms can rotate relative to the pivot member;

a hydraulic actuator connected to the frame and to the pivot member such that the actuator can be operated to move the pivot member such that the follower moves along the cam path, to vary the location of the pivot member relative to the anvil member and the cutting blade, to cause both the link arms to move relative to the frame, and to rotate both the anvil member and the cutting blade in relation to each other;

a conduit for delivering high pressure hydraulic fluid to the actuator;

a pump for pumping hydraulic fluid through the conduit;

an electric motor operatively connected to the pump;

a battery to supply electrical current to the electric motor; and a manually operable switch which controls the flow of electrical current between the battery and the electric motor.

2. A hand manipulatable rescue tool comprising:

a support member which includes a handle and which is sized and shaped so that the support member can be held and manipulated by a rescue worker; and a cutter head comprising (a) a frame defining two opposed parallel cam paths, (b) a first cutting member, which is attached to the frame and has a cutting edge, (c) a second cutting member, which is pivotally mounted to the first cutting member, the second cutting member having a cutting edge positioned such that, when the second cutting member is rotated about an axis of rotation, the cutting edge of the first cutting member travels past the cutting edge of the second cutting member, (d) a pivot pin having a pin axis, (e) first and second followers which are connected to the pivot pin and which are respectively positioned to follow the cam paths, (f) a first link arm, one portion of the first link arm being pivotally mounted to the first cutting member and another portion of the first link arm being pivotally mounted to the pivot pin, (g) a second link arm, one portion of the second link arm being pivotally mounted to the second cutting member and another portion of the second link arm being pivotally mounted to the pivot pin such that both link arms can rotate about the pin axis, and (h) a hydraulic actuator connected to the frame and to the pivot pin such that the actuator can be operated to move the followers along the cam paths, to vary the location of the pivot pin relative to the first cutting member and the second cutting member, to cause both the link arms to move relative to the frame, and to rotate both the first cutting member and the second cutting member in relation to each other, the cutter head being pivotally mounted on the support member so that the entire cutter head can tilt relative to the support member while the first cutting member and the second cutting member are being rotated relative to one another about the axis of rotation to perform a cutting operation.

3. A hand manipulatable rescue tool comprising:

a frame that defines two opposed parallel cam paths;

a first cutting member, which is attached to the frame and has a cutting edge;

a second cutting member, which is pivotally mounted to the first cutting member, the second cutting member having a cutting edge positioned such that, when the second cutting member is rotated about an axis of rotation, the cutting edge of the first cutting member travels past the cutting edge of the second cutting member;

a pivot member;

first and second followers which are connected to the pivot member and which are respectively positioned so that each cam path is followed by one of the first and second followers;

a first link arm, one portion of the first link arm being pivotally mounted to the first cutting member and another portion of the first link arm being pivotally mounted to the pivot member;

a second link arm, one portion of the second link arm being pivotally mounted to the second cutting member and another portion of the second link arm being pivotally mounted to the pivot member such that both link arms can rotate relative to the pivot member; and a hydraulic actuator connected to the frame and to the pivot member such that the actuator can be operated to move the pivot member such that the followers move along the cam paths, to vary the location of the pivot member relative to the first cutting member and the second cutting member, to cause both the link arms to move relative to the frame, and to rotate both the first cutting member and the second cutting member in relation to each other.

4. The tool of claim 3 wherein the frame comprises two track arms which respectively define the two opposed parallel cam paths.

5. The tool of claim 3 wherein the cam paths are two opposed parallel slots defined in the frame.

6. The tool of claim 3 wherein:

the pivot member is a pivot pin; and one of the first and second followers is located at each end of the pivot pin.

7. A hand manipulatable rescue tool comprising:

a support member which includes a handle and which is sized and shaped so that the support member can be held and manipulated by a rescue worker; and a cutter head comprising an anvil member and a cutting blade mounted such that the cutting blade and the anvil member can be rotated relative to one another about an axis of rotation, the cutter head being pivotally mounted on the support member so that both the anvil member and the cutting blade can tilt relative to the support member while the anvil member and the cutting blade are being rotated relative to one another about the axis of rotation to perform a cutting operation.

8. A hand manipulatable rescue tool comprising:

a support member which includes a handle and which is sized and shaped so that the support member can be held and manipulated by a rescue worker; and a cutter head pivotally mounted on the support member so that the cutter head can tilt relative to the support member, the cutter head comprising (a) a frame, (b) an anvil member having a first anvil that is attached to the frame and has a cutting edge, and a second anvil which has a cutting edge shaped the same as the cutting edge of the first anvil, the first and second anvils being spaced apart in fixed positions relative to one another such that the cutting edges face each other and lie in parallel planes, (c) a cutting blade mounted between the anvils such that the blade and the anvil member can be rotated relative to one another about an axis of rotation that is perpendicular to the planes, the blade having two spaced-apart cutting edges which are positioned such that, when the blade is rotated, the cutting edges of the blade overlap and travel along the cutting edges of the anvils, and (d) a motor connected to the frame and to at least one of the blade and the anvil member such that the motor can be operated to rotate at least one of the blade and the anvil member in relation to the other.

9. The tool of claim 8 wherein the motor comprises a hydraulic actuator.

10. The tool of claim 9 wherein the motor is a doubly acting hydraulic cylinder.

11. The tool of claim 9 further comprising:

a conduit for delivering high pressure hydraulic fluid to the actuator; and a pump mounted on the support member for pumping hydraulic fluid through the conduit.

12. The tool of claim 11 further comprising:

an electric motor operatively connected to the pump;

a battery mounted on the support member to supply electrical current to the electric motor; and a manually operable switch on the support member, which switch controls the flow of electrical current between the battery and the electric motor.

13. The tool of claim 11 further comprising:

an auxiliary pump mounted on the support member for pumping hydraulic fluid through the conduit; and a handle operatively connected to the auxiliary pump, the handle being positioned and of sufficient size that a person can raise and lower the handle to operate the auxiliary pump manually.

14. The tool of claim 8 wherein:

the support member defines a central cavity; and at least a portion of the anvil member, the cutting blade, and the motor are contained within the cavity.

15. The tool of claim 8 wherein:

the support member defines two, spaced-apart openings; and the frame comprises two opposed, outwardly-extending trunnions which are journaled in the openings so that the frame can rotate relative to the support member.

16. A hand manipulatable rescue tool comprising:

a support member which includes a handle and which is sized and shaped so that the support member can be held and manipulated by a rescue worker; and a cutter head pivotally mounted on the support member so that the cutter head can tilt relative to the support member, the cutter head comprising (a) a frame, (b) an anvil member having a first anvil that is attached to the frame and has a cutting edge, and a second anvil which has a cutting edge shaped the same as the cutting edge of the first anvil, the first and second anvils being spaced apart in fixed positions relative to one another such that the cutting edges face each other and lie in parallel planes, (c) a cutting blade mounted between the anvils such that the blade and the anvil member can be rotated relative to one another about an axis of rotation that is perpendicular to the planes, the blade having two spaced-apart cutting edges which are positioned such that, when the blade is rotated, the cutting edges of the blade overlap and travel along the cutting edges of the anvils, (d) a first link arm, one portion of the first link arm being pivotally mounted to the anvil member and another portion of the first link arm being pivotally mounted to a pivot pin, (e) a second link arm, one portion of the second link arm being pivotally mounted to the cutting blade and another portion of the second link arm being pivotally mounted to the pivot pin, and (f) a hydraulic actuator connected to the frame and to the pivot pin such that the actuator can be operated to cause both link arms to move relative to the frame and to rotate both the blade and the anvil member in relation to each other.

17. A hand manipulatable rescue tool comprising:

a support member which includes a handle and which is sized and shaped so that the support member can be held and manipulated manually by a human rescue worker;

a frame pivotally mounted on the support member so that the frame can rotate relative to the support member;

an anvil member having a first anvil that is attached to the frame and has a cutting edge, and a second anvil which has a cutting edge shaped the same as the cutting edge of the first anvil, the first and second anvils being spaced apart in fixed positions relative to one another such that the cutting edges face each other and lie in parallel planes;

a cutting blade mounted between the anvils such that the blade and anvil member can be rotated relative to one another about an axis of rotation that is perpendicular to the planes, the blade having two spaced-apart cutting edges which are positioned such that, when the blade is rotated, the cutting edges of the blade overlap and travel along the cutting edges of the anvils; and a motor connected to the frame and to at least one of the blade and the anvil member such that the motor can be operated to rotate at least one of the blade and the anvil member in relation to the other.

18. The tool of claim 17 wherein:

the tool further comprises a power source for driving the motor; and the support member is a housing which encloses both the motor and the power source so that the tool is self-contained.

19. A hand manipulatable rescue tool comprising:

a support member;

a frame pivotally mounted on the support member so that the frame can rotate relative to the support member;

an anvil member having a first anvil that is attached to the frame and has a cutting edge, and a second anvil which has a cutting edge shaped the same as the cutting edge of the first anvil, the cutting edges being of identical curvature and spaced apart in fixed positions relative to one another such that the cutting edges face each other and lie in parallel planes;

a cutting blade mounted between the anvils such that the blade and anvil member can be rotated relative to one another about an axis of rotation that is perpendicular to the planes, the blade having two parallel spaced-apart curved cutting edges which are of identical curvature and positioned such that, when the blade is rotated, the cutting edges of the blade overlap and travel along the cutting edges of the anvils; and a motor connected to the frame and to at least one of the blade and the anvil member such that the motor can be operated to rotate at least one of the blade and the anvil member in relation to the other, the cutting edges of the anvils and the blade being so curvedly shaped such that, when the motor operates at a constant speed, the junction of each edge of the blade and the edge of the adjacent anvil moves at a constant speed along the edge of the blade.

20. A rescue tool comprising:

a hand manipulatable housing;

a cutter head comprising (a) a first cutting member that has a cutting edge, (b) a second cutting member pivotally mounted to the first cutting member, the second cutting member having a cutting edge positioned such that, when the second cutting member is rotated about an axis of rotation, the cutting edge of the first cutting member travels past the cutting edge of the second cutting member, and (c) a hydraulic actuator connected to the housing and to the second cutting member such that the actuator can be operated to rotate the second cutting member about the axis, the cutter head being pivotally mounted to the housing so that both the cutting members and the actuator can tilt relative to the housing;

a conduit for delivering high pressure hydraulic fluid to the actuator;

a pump mounted inside the housing for pumping hydraulic fluid through the conduit;

an electric motor operatively connected to the pump inside the housing;

a battery mounted on the housing to supply electrical current to the electric motor; and a manually operable switch on the housing, which switch controls the flow of electrical current between the battery and the electric motor.

* * * * *

UNITED STATES PATENT AND TRADEMARK OFFICE
CERTIFICATE OF CORRECTION

PATENT NO. : 5,875,554

DATED : March 2, 1999

INVENTOR(S) : Bruno Vogelsanger

It is certified that error appears in the above-identified patent and that said Letters Patent is hereby corrected as shown below:

On the title page, Item [75], the inventor name should read --Bruno Vogelsanger--.

Signed and Sealed this

Nineteenth Day of October, 1999

*Attest:*

Q. TODD DICKINSON

*Attesting Officer*     Acting Commissioner of Patents and Trademarks